United States Patent [19]

Colletti

[11] 4,027,549

[45] June 7, 1977

[54] PLUG-TYPE COUNTERWEIGHT AND LOCK

[75] Inventor: Vincent Colletti, Rocky Hill, Conn.

[73] Assignee: The United States of America as represented by the Secretary of the Navy, Washington, D.C.

[22] Filed: Oct. 16, 1975

[21] Appl. No.: 623,139

[52] U.S. Cl. .......................... 74/573 R; 188/218 A; 301/5 B
[51] Int. Cl.² ........................................ F16F 15/22
[58] Field of Search ................ 74/573; 188/218 A; 301/5 B

[56] References Cited
UNITED STATES PATENTS

| 1,438,768 | 12/1922 | Lapham | 301/5 B |
| 2,269,670 | 1/1942 | Kieckbusch | 301/5 B |
| 3,838,464 | 9/1974 | Doyle | 74/573 X |

FOREIGN PATENTS OR APPLICATIONS 1,059,787  6/1959  Germany ............... 301/5 B Primary Examiner—Samuel Scott
Assistant Examiner—Randall Heald
Attorney, Agent, or Firm—R. S. Sciascia; L. I. Shrago; C. E. Vautrain, Jr.

[57] ABSTRACT

A method of and apparatus for balancing rotating machinery components which incorporate butted flanges or faces is provided. A circumferential slot is formed on the interior face of one of the flanges and a hole is bored in either flange communicating with the slot. A sheet metal lock is inserted through the hole along the side surface thereof and a balancing weight or counterweight is inserted adjacent the lock. End tabs in the lock which extend in opposite directions are bent to support and retain the counterweight within the hole in the flange.

10 Claims, 4 Drawing Figures

PLUG-TYPE COUNTERWEIGHT AND LOCK

The present invention concerns a method of and means for fastening balancing weights to rotating bodies and, more particularly, such a means which is easily installed or removed and does not require threads, wedging, peening or special tooling.

There are several forms of balancing weights or counterweights to be applied to rapidly rotating rotors and the like which are attached in a variety of ways such as with an annular groove, dovetail-like shape, etc. Some balancing weights are formed so as to correspond to the cross section of a dovetailed groove and usually are inserted into the groove and secured against tangential displacement by wedging or being peened over in the rotating body. Another type of balancing weight is the resilient insert which spreads against the sidewalls of a recess or groove. These forms of fastening and securing balancing weights are undesirable for several reasons among which are a requirement that the balancing weights fit accurately in the annular groove so as to deform the rotating body as little as possible, that the weights which are wedged or peened over can only be removed or displaced by the destruction of the wedged or peened over connection thereby damaging the rotating body as well as the balancing weight, and that the resilient inserts necessarily protrude beyond the rotating body and are not easily interchanged. Also, stressed are produced in the rotating body by the wedged or peened over weights which could produce a dangerous condition when the rotating body is operated at high rotational speeds.

The present invention avoids the disadvantages of prior balancing weights for rotating bodies by providing a simple construction of replaceable balancing weight and deformable tab for insertion in the rotating body and securing the balancing weight loosely but adequately in view of the additional holding forces provided by the rotation of the rotating body.

Accordingly, it is an object of the present invention to provide a balancing weight for rotating bodies and means for attaching such weight which do not introduce additional stresses into the rotating body.

Another object of this invention is to provide a balancing weight for rotating bodies which may be secured thereto without wedging or peening over of the weight in relation to the rotating body and without securing the weight by means of threads in the weight and the rotating body.

A further object of the present invention is to provide a method of and means for inserting balancing weights into a rotating body and securing such weights therein in a manner such that the weight is readily removable and easily replaced by substitute weights of different value as required.

Other objects, advantages and novel features of the invention will become apparent from the following detailed description thereof when considered in conjunction with the accompanying drawing in which like numerals represent like parts throughout and wherein.

Figure 1:
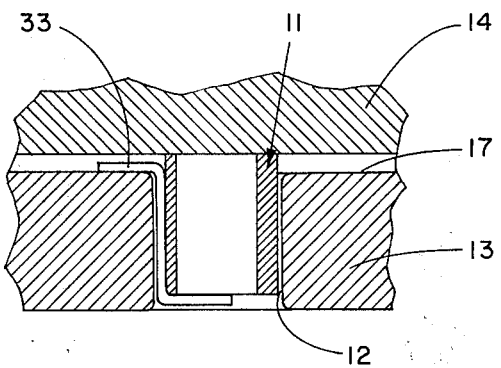
FIG. 1 is a sectional view of one embodiment of the balancing method and means of the present invention for balancing rotating bodies.
Figure 2:
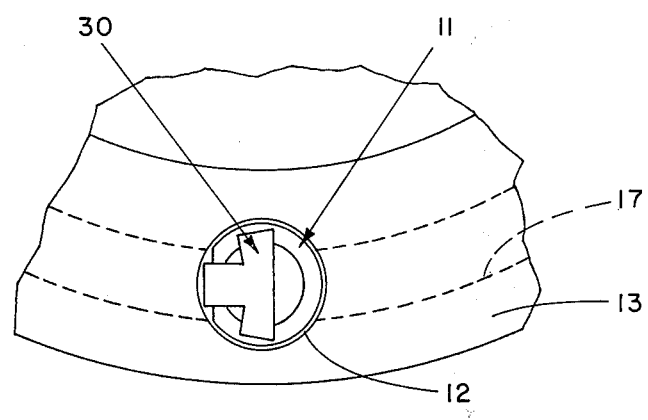
FIG. 2 is a bottom view partly in section of the embodiment of FIG. 1.
Figure 3:
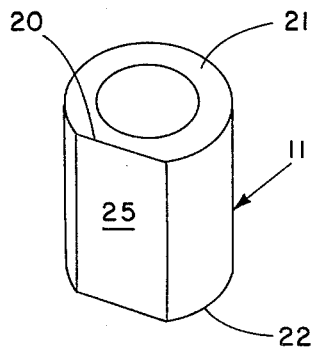
FIG. 3 is an enlarged isometric view of the balancing weight shown in the embodiment of FIGS. 1 and 2.
Figure 4:
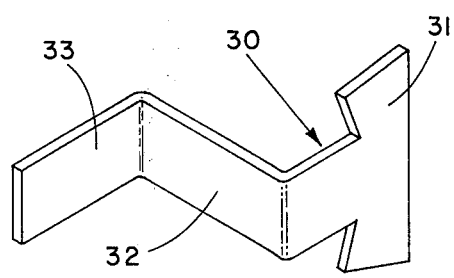
FIG. 4 is an enlarged isometric view of the balancing weight lock shown in the embodiment of FIGS. 1 and 2.

Referring to the drawing, FIG. 1 is a sectional view illustrating the placement of a balancing weight 11 in a hole 12 in a rotatable flange 13. Flange 13 and a second flange 14 conventionally coupled thereto are rotating components of equipment such as machinery having such abutting flanges. In flange 13 a groove 17 is provided to accommodate a means for securing balancing or counterweight 11. It will be appreciated that hole 12 may be drilled in flange 14 in lieu of flange 13 to communicate with groove 17 within the inventive concept. In this embodiment of the invention weight 11, which is shown enlarged in FIG. 3, is cut along a segment 20 of the periphery of opposing end faces 21 and 22 so as to form a planar face 25. In FIG. 2, which is a bottom view of the machinery flange combination shown in FIG. 1, weight 11 is shown inserted in hole 12 and held in place therein by a lock 30 which is shown in enlarged isometric view in FIG. 4. Weight 11 has a longitudinal dimension such that the thickness of lock 30 will, when conformed to the undersurface of weight 11, extend a distance in hole 12 which is slightly less than the depth of the hole so that the lock will not extend beyond the outer flange surface. Lock 30 preferably is made in linear form and foled as shown in FIG. 4 so that it is provided with an enlarged wing shaped end 31, a section 32 transverse to end 31 and substantially equal in length to the longitudinal dimension of weight 11, and a tab end 33 which is adapted to be inserted into groove 17 in flange 13. Lock 30 preferably is made of sufficiently soft metal so as to be easily bent in the manner shown in FIG. 4.

In assembling the balancing weight and lock into a recess such as hole 12 in a flange to be balanced, tab end 33 first is formed by bending the lock at a selected length and preferably a right angle and then the lock is positioned in hole 12 and thereafter the tab end is inserted into groove 17 as shown in FIG. 1. Weight 11 is next inserted into hole 12 with face 25 adjacent lock 30 and then transverse section 32 and winged end 31 are formed by further bending of the lock as shown in both FIGS. 1 and 2. That is, with weight 11 held against the undersurface of flange 14, end 31 of the tab is folded over at a preferably 90° angle and in this configuration holds weight 11 in position in flange 13.

Lock 30 may be formed in a variety of configurations so as to insure that a desired bearing surface area is provided for support of weight 11. Lock 30 and weight 11 are, it will be appreciated, easily adapted to be made in varying sizes and shapes and of various materials so as to conform to either existing or specially made holes in machinery or other flanges as well as providing the desired balancing moment. The ease with which end 31 of lock 30 may be unfolded renders the counterweight and lock of the present invention extremely adaptable to change in a very brief and simple operation.

There is thus provided a method of balancing rotating machinery and other abutting flanges which permits ready installation and change of the weight and wherein the position of the weight in the flange 13 may be varied within wide limits. A circumferential slot is the only alteration other than a hole, where necessary, required in flange 13. It will be readily appreciated that flange 13 when uncoupled from flange 14 may be rotated relative thereto to any azimuthal position with respect thereto with the weight and lock in place since continuous groove 17 provides for 360° reception of tab end 33 between flanges 13 and 14.

Weight 11 may be made of any desired metal or other substance which may be firmly shaped, while lock 30 preferably is made of sheet metal but also may be made of other types of metal or metal alloy within the concept of the invention. A variety of weights may be formed having the same outer shape as that shown in FIG. 3 by varying the inner diameter of the weights and in this manner varying the amount of material therein.

The balancing means and method of the present invention are especially suitable to balancing rotating parts or flanges which cannot accommodate the threads associated with fold-type weights and which also cannot accommodate other forms of balancing weights which introduce high stress concentration factors in the members in which they are inserted and, therefore, are unacceptable. The balancing weight and lock of the present invention also is easily installed and removed without any requirement for special tooling.

Obviously many modifications and variations of the present invention are possible in the light of the above teachings. For example, the weight may be square, hexagonal, etc. in cross section and the face of the weight which is formed to accommodate the transverse portion of the lock may be in the form of a groove instead of the planar area shown. Also, in some instances the lock may pass through the central opening in the weight and a notch in the top thereof in lieu of along one side of the weight, not shown, as shown in the illustrated embodiment.

What is claimed is:
1. A balancing device adapted for rapid change of weight within a constant outer weight configuration comprising:
    a rotatable body adapted to be balanced by a cylindrical weight,
        a generally cylindrical weight having a constant outer configuration and replaceable by substitution of weights having selected amounts of internal mass removed,
        a hole in said body formed to accommodate said weight and an elongate locking strip for holding said weight in place in said hole,
    said locking strip foldable at least 90° at selected transverse positions and adapted when folded to support said weight at one end,
    said body having a recess for receiving one end portion of said locking strip,
    said one end portion folded at an angle of substantially 90° to the remainder of said locking strip,
    said weight having an outer longitudinally extending recess for receiving an intermediate portion of said locking strip,
    said weight shorter in length than the depth of said hole and said locking strip folded at its end remote from said one end at an opposite angle to the fold of said one end for supporting said weight,
    whereby said weight may be applied by folding said strip at said one end, inserting the strip in said recess in said rotatable body, inserting said weight in said hole with said intermediate strip portion in said longitudinal recess, and folding said other end of said strip across the exposed surface of said weight.
2. The device of claim 1 wherein said weight has an axial void and said other end of said strip is formed with lateral portions which extend substantially to the adjacent walls of said hole when said other end is folded.
3. The device of claim 2 wherein said body is formed of abutting disc-like members and said body recess is an annular recess in one of the abutting surfaces of said members.
4. The device of claim 3 wherein said hole is formed in any one of said members in communication with said annular recess and said weight may be disposed in any one of said members and positioned circumferentially as desired with respect to said annular recess.
5. The device of claim 3 wherein said annular recess and said hole are disposed in the same disc-like member.
6. The device of claim 1 wherein said recess is a planar surface formed by removing a longitudinal segment of said cylindrical weight.
7. An arrangement for balancing rotating bodies having abutting discs or flanges wherein at least one disc or flange is provided with an annular recess comprising:
    a pair of abutting disc-like members in said rotating bodies having abutting surfaces;
    an annular recess in one of said abutting surfaces and a hole transverse to said recess in any one of said disc-like members communicating with said recess;
    a cylindrical balancing weight adapted to be received in close fitting relationship in said hole;
    an elongate locking member adapted to be folded at one end for insertion circumferentially into said recess,
        said locking member substantially traversing the dimension of said hole transverse to said recess,
        said locking member adapted to be folded at the end opposite said one end and in the opposite direction so as to pass under and support said weight in said hole,
    said weight shorter in length than the depth of said hole so that the outer surface of said other end of said locking member when folded will be planar with or disposed within the adjacent surface of the disc-like member having said hole.
8. The device of claim 7 wherein said weight has an axial opening of at least sufficient width to accommodate said locking member and the inner disposed end of said weight is cut away to accommodate a transverse section of said folded one end of said locking member,
    whereby said weight is applied to a rotating body by folding said locking member at said one end, inserting said one end in said annular recess, passing the weight over the locking member into said hole, and folding said other end of the locking member across an exposed end surface of said weight.
9. A method of balancing a rotating body with a weight readily changeable in mass while maintaining a constant outer configuration or with a plurality of weights of differing mass having the same outer configuration comprising:
    first inserting a locking strip in an opening in said body;
    next engaging the locking strip in a recess in said body transverse to the opening therein;
    then inserting a balancing weight in the opening alongside the portion of the locking strip therein; and lastly
    bending the protruding end of the locking strip over the exposed end of the balancing weight.
10. The method as defined in claim 9 and further including adjusting the balancing weight to achieve rotary balance of said body by varying the mass of the balancing weight through internal removal of mass so as to maintain a constant outer configuration of the balancing weight.

* * * * *